US012495546B2

United States Patent
Lim et al.

(10) Patent No.: US 12,495,546 B2
(45) Date of Patent: Dec. 9, 2025

(54) SEMICONDUCTOR MEMORY DEVICE HAVING SEGMENTED CELL BIT LINE

(71) Applicant: SAMSUNG ELECTRONICS CO., LTD., Suwon-si (KR)

(72) Inventors: Juwon Lim, Suwon-si (KR); Younghun Seo, Suwon-si (KR); Sang-Yun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 394 days.

(21) Appl. No.: 18/106,620

(22) Filed: Feb. 7, 2023

(65) Prior Publication Data

US 2024/0064973 A1  Feb. 22, 2024

(30) Foreign Application Priority Data

Aug. 16, 2022  (KR) .................. 10-2022-0102061

(51) Int. Cl.
   *H10B 12/00*  (2023.01)
(52) U.S. Cl.
   CPC ........... *H10B 12/50* (2023.02); *H10B 12/315* (2023.02); *H10B 12/482* (2023.02)
(58) Field of Classification Search
   CPC .... H10B 12/50; H10B 12/315; H10B 12/482; G11C 5/025; G11C 5/063; G11C 7/06; G11C 7/14; G11C 7/18; G11C 8/14; G11C 11/4091; G11C 11/4097; G11C 7/12

See application file for complete search history.

(56) References Cited

U.S. PATENT DOCUMENTS

| 6,891,742 | B2 | 5/2005 | Takano et al. |
| 9,767,919 | B1 | 9/2017 | He et al. |
| 9,965,415 | B2 | 5/2018 | Wu et al. |
| 10,490,258 | B2 | 11/2019 | Onuki et al. |
| 2003/0020097 | A1 | 1/2003 | Lee |

(Continued)

FOREIGN PATENT DOCUMENTS

| JP | 7074511 B2 | 5/2022 |
| KR | 10-2001-0065694 A | 7/2001 |

(Continued)

OTHER PUBLICATIONS

Extended European Search Report dated May 6, 2024, of the corresponding European Patent Application No. 23183877.2.

(Continued)

*Primary Examiner* — David Vu
(74) *Attorney, Agent, or Firm* — Muir Patent Law, PLLC

(57) ABSTRACT

A semiconductor memory device includes: a memory cell array located in a first layer and including a word line, a cell bit line, and a memory cell located in a region where the word line and the cell bit line are crossed; and a bit line sense amplifier located in a second layer, different from the first layer. The bit line sense amplifier is connected to a bit line that is connected to the cell bit line and to a complementary bit line corresponding to the bit line. The bit line sense amplifier detects data stored in the at least one memory cell. Each of the at least one cell bit line is segmented into two or more portions, and the two or more portions are respectively connected to the bit line and the complementary bit line connected to the bit line sense amplifier.

20 Claims, 11 Drawing Sheets

(56) References Cited

U.S. PATENT DOCUMENTS

2012/0043642 A1    2/2012  Kuroki
2018/0374864 A1*  12/2018  Fukuzumi .............. H10B 43/27
2019/0180811 A1    6/2019  Kim et al.
2021/0366534 A1   11/2021  He

FOREIGN PATENT DOCUMENTS

| | | |
|---|---|---|
| KR | 10-0773161 B1 | 11/2007 |
| KR | 10-2012-0018016 A | 2/2012 |
| KR | 10-2013-0029464 A | 3/2013 |

OTHER PUBLICATIONS

Partial European Search Report dated Jan. 2, 2024, issued by the European Patent Office for the corresponding European Patent Application No. 23183877.2.

* cited by examiner

SEMICONDUCTOR MEMORY DEVICE HAVING SEGMENTED CELL BIT LINE

CROSS-REFERENCE TO RELATED APPLICATION

Korean Patent Application No. 10-2022-0102061 filed in the Korean Intellectual Property Office on Aug. 16, 2022, and entitled Semiconductor Memory Device Having Segmented Cell Bit Line, is incorporated herein by reference in its entirety.

BACKGROUND

1. Field

Embodiments relate to a semiconductor memory device. More particularly, embodiments relate to a semiconductor memory device having a structure in which a memory cell array and a bit line sense amplifier (BLSA) are overlapped in a plane.

2. Description of the Related Art

Semiconductor memory devices may be classified into volatile memory devices and non-volatile memory devices. The volatile memory device loses stored data when a power supply is turned off, whereas the non-volatile memory device retains the stored data even when the power supply is turned off.

Various cell structures are being developed to improve integration of the semiconductor memory devices.

The above information disclosed in this Background section is only for enhancement of understanding of the background of the invention, and therefore it may contain information that does not form the prior art that is already known in this country to a person of ordinary skill in the art.

SUMMARY

A feature of an example embodiment of the present invention is to increase a charge sharing voltage by reducing a capacitance of a cell bit line and to reduce power consumption of the bit line sense amplifier.

Another feature of an example embodiment of is to improve a capacity of a memory device by making the cell bit lines that are unpaired and not used on the periphery of the memory device available.

A semiconductor memory device according to an example embodiment includes: a memory cell array located in a first layer and including at least one word line, at least one cell bit line, and at least one memory cell located in a region where the at least one word line and the at least one cell bit line are crossed. The semiconductor memory device further includes at least one bit line sense amplifier located in a second layer, different from the first layer, and the bit line sense amplifier is connected to at least one bit line that is connected to the at least one cell bit line and to at least one complementary bit line corresponding to the at least one bit line. The bit line sense amplifier detects data stored in the at least one memory cell. Each of the at least one cell bit line is segmented into at least two portions, and the at least two portions are respectively connected to the at least one bit line and the at least one complementary bit line connected to the at least one bit line sense amplifier.

At least one memory cell may or may not be located in a region overlapping, in the vertical direction, a region in which each of the at least one cell bit line is segmented to be separated from each other.

Each of the at least one cell bit line may be segmented in three or more portions to be separated from each other, and regions where each of the at least one of cell bit lines may be segmented to be separated from each other includes a first separation region and a second separation region, and the at least one memory cell may be located in a region overlapping the first separation region in the vertical direction, and the at least one memory cell is not located in a region overlapping the second separation region in the vertical direction.

The at least one memory cell may include a vertical channel transistor, and a channel of the vertical channel transistor may include indium gallium zinc oxide (IGZO).

The at least two portions may be formed on different layers from the at least one bit line and the at least one complementary bit line connected to the at least one bit line sense amplifier, with a first insulation layer interposed therebetween and may be connected through a via penetrating the first insulation layer.

The at least one bit line sense amplifier may include a connection wiring layer, and a connection between the at least one bit line sense amplifier and the at least one bit line and the at least one complementary bit line may be made via the connecting wiring layer.

The at least one bit line and the at least one complementary bit line may be formed in a different layer from the connecting wiring layer with a second insulation layer located therebetween and may be connected to the connecting wiring layer through a via penetrating the second insulation layer.

A semiconductor memory device according to an embodiment of the present invention includes: a memory cell array located in a first layer and including at least one word line, at least one cell bit line, and at least one memory cell, which is located in a region where the at least one word line and the at least one cell bit line are crossed; a dummy cell array, which is located in the first layer at at least one circumferential side of the memory cell array includes at least one dummy word line, at least one dummy cell bit line, and at least one dummy memory cell located in a region where the at least one dummy word line and the at least one dummy cell bit line are crossed; and at least one bit line sense amplifier located in a second layer, different from the first layer, and connected to at least one bit line connected to the at least one cell bit line and at least one complementary bit line corresponding to the at least one bit line. The at least one bit line sense amplifier detects data stored in the at least one memory cell. The at least one beat line sense amplifier includes an edge bit line sense amplifier that is located at the boundary between the memory cell array and the dummy cell array. The at least one bit line and the at least one complementary bit line connected to the edge bit line sense amplifier are respectively connected to the at least one cell bit line and the at least one dummy cell bit line.

The at least one dummy cell bit line may include an odd-numbered dummy cell bit line and an even-numbered dummy cell bit line, and one of the odd-numbered dummy cell bit lines and one of the even-numbered dummy cell bit lines, which are adjacent to each other, are connected to each other through a switch. A turn on signal may always be applied to at least one of the dummy word lines. The switch may turn on after the edge bit line sense amplifier is activated following charge sharing and turns off after an equalization signal is applied to the edge bit line sense amplifier.

The at least one dummy cell bit line may include an odd-numbered dummy cell bit line and an even-numbered dummy cell bit line, and one of the odd-numbered dummy cell bit lines and one of the even-numbered dummy cell bit lines, which are adjacent to each other, may be connected to each other. A turn on signal may always be applied to at least one of the dummy word lines.

The cell bit line connected to the edge bit line sense amplifier may be either an odd cell bit line or an even cell bit line.

The edge bit line sense amplifier may be located to an edge of the column decoder side of the memory cell array and an opposite edge, respectively.

At least one memory cell may include a vertical channel transistor, and a channel of the vertical channel transistor may include indium gallium zinc oxide (IGZO).

The at least one cell bit line and the at least one dummy cell bit line may be formed in different layers from the at least one bit line and the at least one complementary bit line connected to the edge bit line sense amplifier with a first insulation layer located therebetween and may be connected to each other through a via penetrating the first insulation layer.

The semiconductor memory device according to an embodiment of the present invention may increase the charge-sharing voltage and reduce power consumption of the bit line sense amplifier by segmenting the cell bit line into a plurality and reducing the capacitance of the cell bit line.

In addition, the semiconductor memory device according to an embodiment of the present invention may improve the capacity of the memory device by disposing the dummy cell array, thereby enabling the use of the cell bit line that was not used due to unpairing on the periphery of the memory device.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
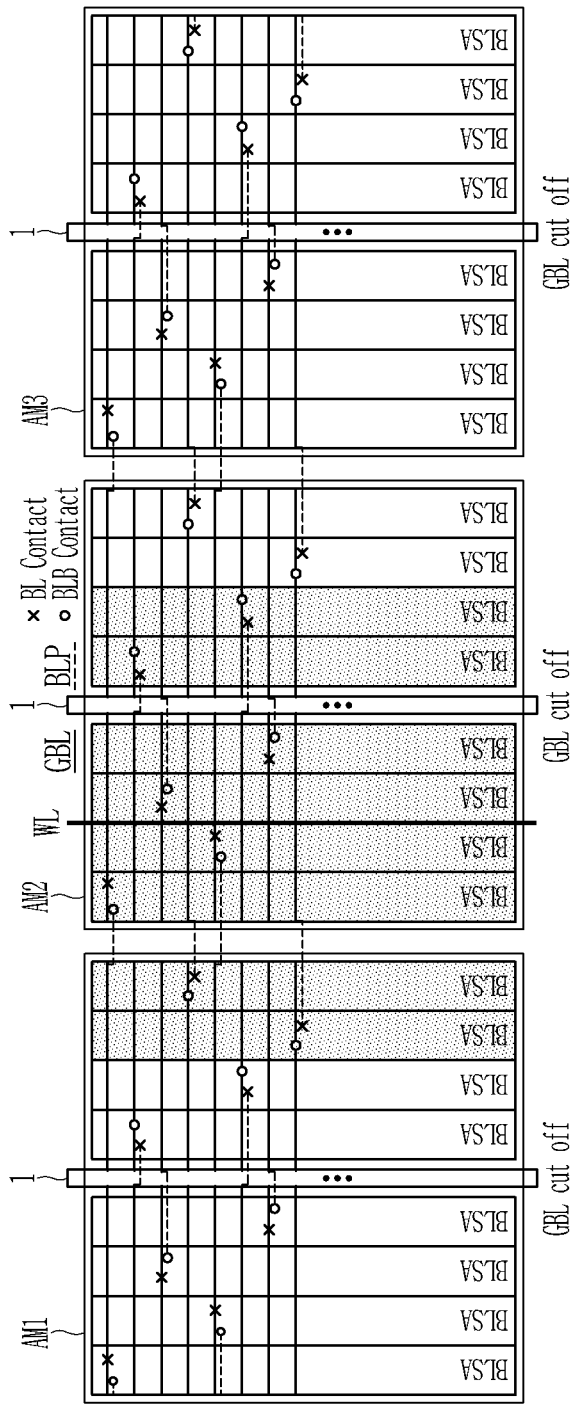
FIG. 1 is a layout view of a bit line sense amplifier and a cell bit line of a semiconductor memory device according to an embodiment of the present invention.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

The drawings and descriptions are to be regarded as illustrative in nature and not restrictive. Throughout the specification, the same reference numerals refer to the same constituent elements.

Further, the size and thickness of each configuration shown in the drawings are optionally illustrated for better understanding and ease of description, the present invention is not limited to shown drawings. In the drawings, the thickness of the layer, the film, the plate, the region, etc. may be exaggerated for clarity. In the drawings, the thickness of some layers and regions may be exaggerated for better understanding and ease of description.

As used herein, the singular forms "a" and "an" are intended to include the plural forms as well, unless the context clearly indicates otherwise.

In the specification and claims, the term "and/or" is intended to include any combination of the terms "and" and "or" for its meaning and interpretation. For example, "A and/or B" may be understood to mean "A, B, or A and B".

The phrase "at least one of —" in the specification and claims range is intended to include the meaning of "at least one selected from the group of —" for its meaning and interpretation. For example, "at least one of A and B" may be understood to mean "A, B, or A and B".

It will be understood that although the terms "first" and "second" are used to describe various elements, these elements should not be limited by these terms. These terms are only used to distinguish one element of information from another. For example, without departing from the scope of the present disclosure, first constituent elements may be termed as second constituent elements; and similarly, second constituent elements may also be termed as first constituent elements.

When an element, such as a layer, a film, a region or a substrate, is referred to as being "on" another element, it may be directly on the other element, or an intermediate element may also be present. In contrast, when an element is referred to as being "directly on" another element, there is no intermediate element. In addition, throughout the specification, the term 'above' of the target element should be understood as positioning above or below the target element and does not necessarily mean positioning 'above' with reference to the opposite direction of gravity.

For example, spatially relative terms "below" and "above" may be used to easily describe the relationship between one element or constituent element and other constituent element as shown in the drawing. Spatially relative terms are intended to include other directions in the device being used or operated in addition to the directions shown in the drawing. For example, when the device shown in the drawing is turned over, a device positioned 'below' another device may be positioned 'above' another device. Accordingly, the exemplary term "below" may include both lower and upper positions. A device may also be oriented in different directions, so spatially relative terms may be interpreted differently depending on the direction.

When an element (or a region, a layer, a part, etc.) is referred to as "connected" or "coupled" to another element in the specification, it is directly located, connected, or coupled to the other element mentioned above, or there may be an element intervening therebetween.

The terms "connected to" or "coupled to" may include a physical or electrical connection or coupling.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
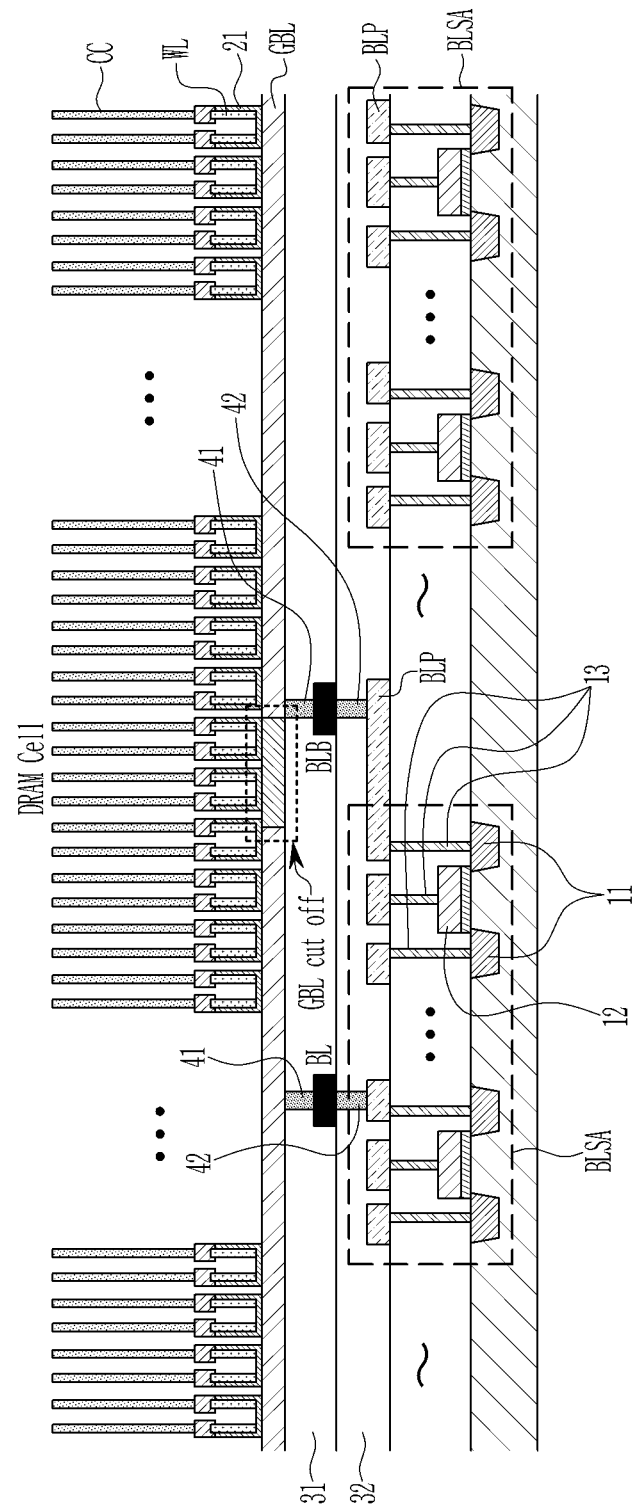
FIG. 2 is a layer cross-sectional view of a semiconductor memory device of FIG. 1.

FIG. 1 is a layout view of a bit line sense amplifier and a cell bit line of a semiconductor memory device according to an embodiment of the present invention, and FIG. 2 is a layer cross-sectional view of a semiconductor memory device of FIG. 1.

Referring to FIG. 1 and FIG. 2, in an exemplary embodiment, a semiconductor memory device may include a memory cell array layer in which a plurality of memory cells is located and a bit line sense amplifier layer in which a plurality of bit line sense amplifier (BLSA) blocks is located.

The memory cell array layer may include a plurality of array matrices AM1, AM2, and AM3 including a plurality of memory cells, respectively. Each of a plurality of array matrix AM1, AM2, and AM3 may include a plurality of cell bit lines GBL and a plurality of word lines WL, and the memory cells may be located in regions where a plurality of cell bit lines GBL and a plurality of word lines WL intersect each other. Here, the plurality of memory cells may be volatile memory cells such as DRAM, may be resistive memory cells such as PRAM (phase-change RAM), RRAM (resistive RAM), etc., and may be NFGM (Nano Floating Gate Memory), PoRAM (Polymer RAM), MRAM (Magnetic RAM), FeRAM (Ferroelectric RAM), or flash (flash) memory cells. Each memory cell, as shown in FIG. 2, may include a cell capacitor CC and a transistor that connects or blocks the cell capacitor CC and the cell bit line GBL, and the transistor includes a channel 21 that is turned on and off according to a word line WL signal. Here, the channel 21 may be formed in a vertical direction with respect to the array matrices AM1, AM2, and AM3, and the cell bit line GBL below the channel 21 and the cell capacitor above the channel 21 may be connected. The channel 21 may include indium gallium zinc oxide (IGZO).

The cell bit lines GBL included in two adjacent array matrices AM1, AM2, and AM3 may be separated from each other, and the cell bit line GBL, the word line WL and the memory cell may not be located in the boundary region between the array matrices AM1, AM2, and AM3. Each of a plurality of array matrices AM1, AM2, and AM3 may have a cell bit line cut off region (GBL cut off, 1), and the cell bit line cut off region (GBL cut off, 1) may be installed multiply for each of the array matrix AM1, AM2, and AM3. In the cell bit line cut off region (GBL cut off, 1), the cell bit line GBL is cut and separated on both sides, but the word line WL and the memory cell may be located in the cell bit line cut off region (GBL cut off, 1).

Referring to FIG. 2, the bit line sense amplifier layer may be located under the memory cell array layer, and may include a transistor, a wiring layer BLP, and a via 13 connecting the transistor and the wiring layer BLP. The transistor may include a source/drain 11 and a gate electrode 12, and the source/drain 11 and the gate electrode 12 may be connected to the wiring layer BLP that is located on the bit line sense amplifier layer through via 13 that is located in the insulation layer.

Interlayer insulating layers 31 and 32, a bit line BL, and a complementary bit line BLB may be located between the bit line sense amplifier layer and the memory cell array layer. The bit line sense amplifier BLSA may be connected to the bit line BL and the complementary bit line BLB through the via 42 located in the interlayer insulating layer 32. The bit line BL and the complementary bit line BLB may be connected to the cell bit line GBL through the via 41 located in the interlayer insulating layer 31 (a BL contact, a BLB contact). Here, the bit line BL and the complementary bit line BLB connected to one bit line sense amplifier BLSA may respectively connected to the cell bit line GBLs separated on both sides in the boundary region of two adjacent array matrices AM1, AM2, and AM3, or may be respectively connected the cell bit lines GBL separated on both sides in the cell bit line cut off region (GBL cut off, 1). Through this, an open bit line structure may be implemented.

As described above, by forming the cell bit line GBL to be segmented into the unit of the array matrix AM1, AM2, and AM3, or by locating the cell bit line cut off region (GBL cut off, 1) within one array matrix for the cell bit line GBL to be segmented into a plurality of parts, it is possible to reduce the cell bit line capacitance CBL, thereby increasing a charge sharing voltage (AVBL), and reducing the power consumption of the bit line sense amplifier.

Figure 3:
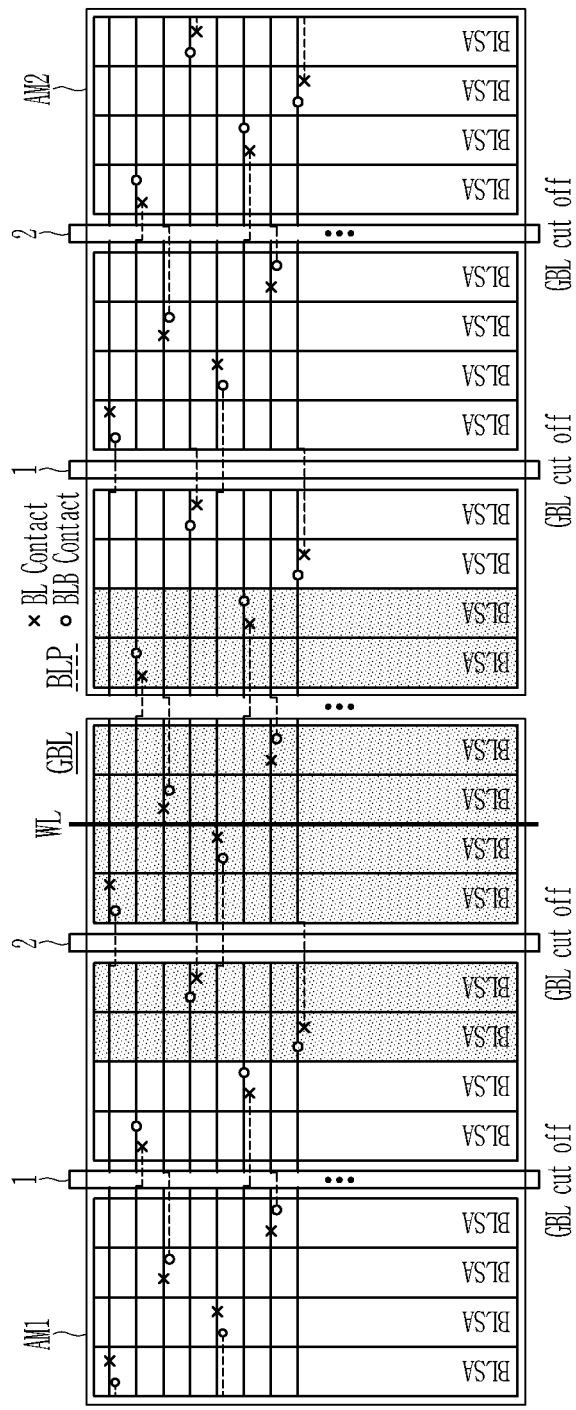
FIG. 3 is a layout view of a bit line sense amplifier and a cell bit line of a semiconductor memory device according to another embodiment of the present invention.

FIG. 3 is a layout view of a bit line sense amplifier and a cell bit line of a semiconductor memory device according to another embodiment of the present invention.

For the semiconductor memory device of FIG. 3, compared to the semiconductor memory device of FIG. 1, the number of the cell bit line cut off regions (GBL cut off, 1, 2) located in one array matrix AM1 and AM2 is different. The semiconductor memory device of FIG. 3 may further reduce the cell bit line capacitance CBL by disposing two cell bit line cut off regions (GBL cut off, 1, 2) in one array matrix AM1 and AM2.

Figure 4:
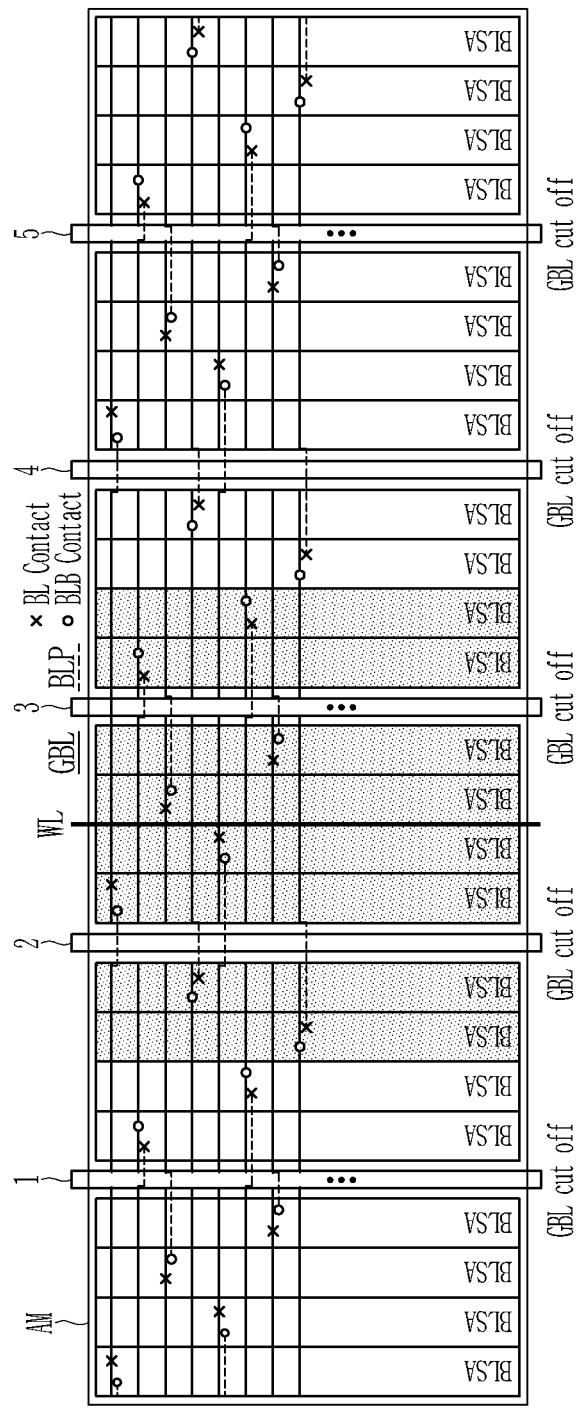
FIG. 4 is a layout view of a bit line sense amplifier and a cell bit line of a semiconductor memory device according to another embodiment of the present invention.

FIG. 4 is a layout view of a bit line sense amplifier and a cell bit line of a semiconductor memory device according to another embodiment of the present invention.

The semiconductor memory device of FIG. 4 includes only one array matrix AM, and five cell bit line cut off regions (GBL cut off, 1, 2, 3, 4, 5) are located in the array matrix AM, thereby the length of the cell bit line may be reduced, and the capacitance CBL may be reduced.

As described above, as the cell bit line is segmented into several parts by increasing the number of the array matrices or the number of the cell bit line cut off regions, the cell bit line capacitance may be reduced. At this time, when it is necessary to increase the number of the bit line sense amplifiers in proportion to the number of the segments of the cell bit line, by locating the memory cell array and the bit line sense amplifier in different layers, it is possible to provide a sufficient amount of the bit line sense amplifiers.

Figure 5:
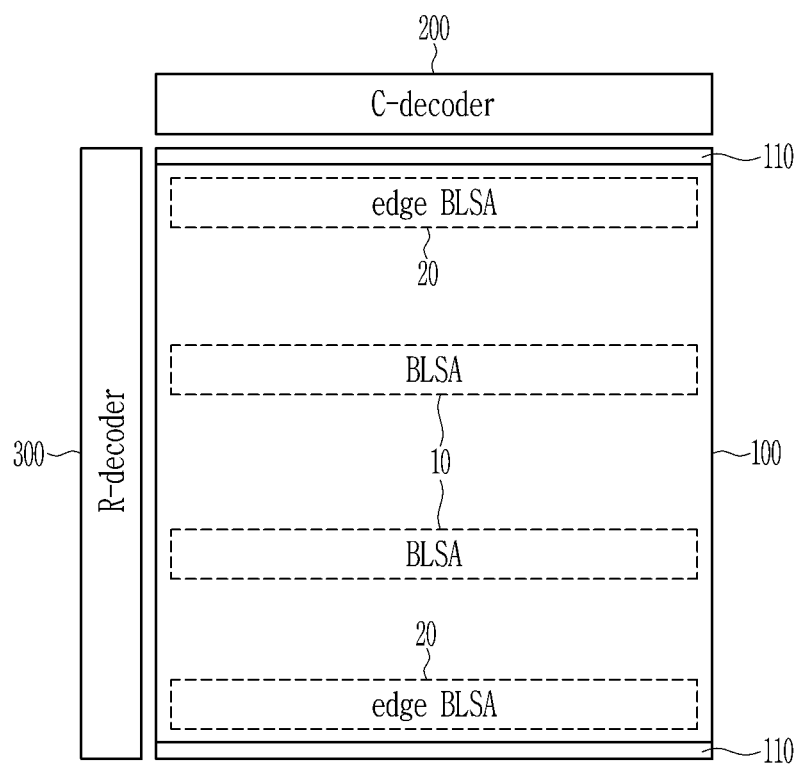
FIG. 5 is a layout view of a semiconductor memory device according to another embodiment of the present invention showing an arrangement position of an edge bit line sense amplifier (an edge BLSA).
Figure 6:
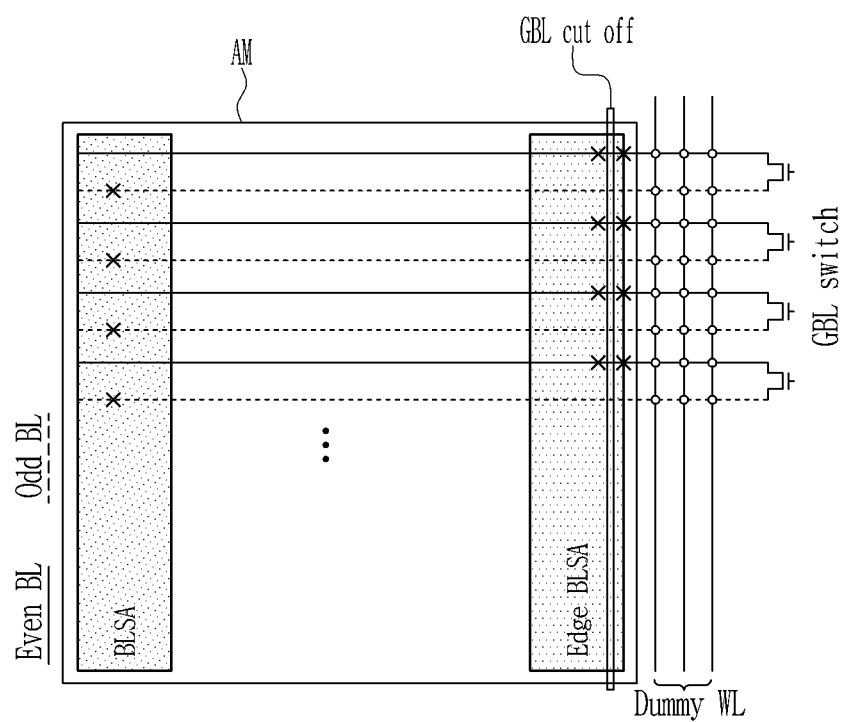
FIG. 6 is a more detailed partial layout view of a semiconductor memory device of FIG. 5.
Figure 7:
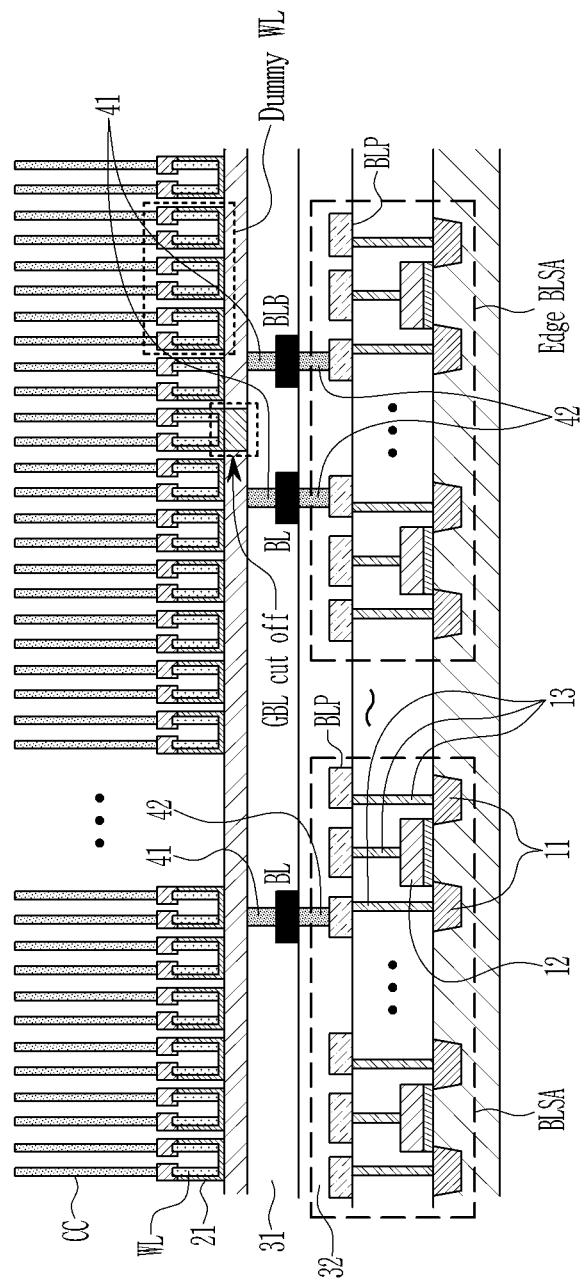
FIG. 7 is a layer cross-sectional view of a semiconductor memory device of FIG. 6.
Figure 8:
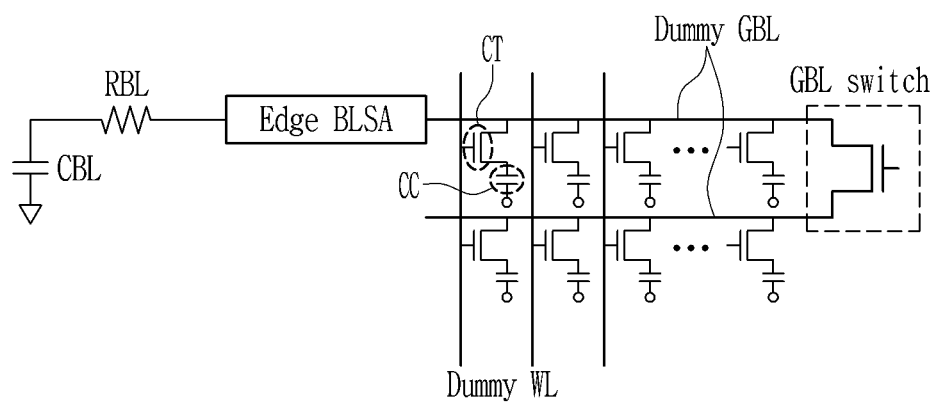
FIG. 8 is a circuit diagram of a semiconductor memory device of FIG. 6.

FIG. 5 is a layout view of a semiconductor memory device according to another embodiment of the present invention showing an arrangement position of an edge bit line sense amplifier (an edge BLSA), FIG. 6 is a more detailed partial layout view of a semiconductor memory device of FIG. 5, FIG. 7 is a layer cross-sectional view of a semiconductor memory device of FIG. 6, and FIG. 8 is a circuit diagram of a semiconductor memory device of FIG. 6.

Referring to FIG. 5 to FIG. 7, the semiconductor memory device according to another embodiment of the present invention may include a memory cell array layer in which a plurality of memory cells is located and a bit line sense amplifier layer in which a plurality of bit line sense amplifier BLSA blocks is located. A column decoder (C-decoder, 200) may be located on one side or both sides of the memory cell array 100, and a row decoder (R-decoder, 300) may be located on the other side or both sides of the memory cell array 100. The column decoder 200 and row decoder 300 are devices involved in cell bit line and word line driving, respectively. The column decoder 200 and the row decoder 300 may be formed over some or all of the memory cell array layer and the bit line sense amplifier layer.

The memory cell array layer may include a memory cell array 100 and a dummy cell array 110 located at both corners thereof. The dummy cell array 110 may be located at a corner portion where the memory cell array 100 is adjacent to the column decoder 200 and a corner portion facing it, respectively.

The memory cell array 100 may include a plurality of cell bit lines GBL and a plurality of word lines WL, and the memory cells may be located on the regions where a plurality of cell bit lines GBL and a plurality of word lines WL are crossed. Here, a plurality of memory cells may be volatile memory cells such as DRAM, may be a resistive memory cell such as PRAM (a phase-change RAM), RRAM (a resistive RAM), etc., may be NFGM (Nano Floating Gate Memory), PoRAM (Polymer RAM), MRAM (Magnetic RAM), FeRAM (Ferroelectric RAM), or flash memory cells. Each memory cell, as shown in FIG. 7, may include a cell capacitor CC and a transistor CT that connects or blocks the cell capacitor CC to the cell bit line GBL, and the transistor CT includes a channel 21 that is turned on and off according to the word line WL signal. Here, the channel 21 may be formed in the vertical direction with respect to the array matrices AM1, AM2, and AM3, and the cell bit line GBL below the channel 21 and the cell capacitor CC above the channel 21 may be connected. The channel 21 may include indium gallium zinc oxide (IGZO).

The dummy cell array 110 may include a plurality of dummy cell bit lines Dummy GBL and a plurality of dummy word lines Dummy WL, and the dummy memory cells may be located in regions where a plurality of dummy cell bit lines Dummy GBL and a plurality of dummy word lines Dummy WL intersect. The cell structure of the dummy cell array 110 may be the same as the cell structure of the memory cell array 100. The dummy cell array 110 may include a transistor switch GBL switch connecting two adjacent dummy cell bit lines Dummy GBL, and the transistor switch GBL switch may be a switch to conduct two dummy cell bit lines Dummy GBL connected thereto at predetermined timing. The dummy cell bit lines Dummy GBL may be separated from the cell bit line GBL of the memory cell array 100. A turn on signal is always applied to at least one of the dummy word lines Dummy WL so that the transistor CT of the dummy memory cell may be maintained in a turned-on state, and accordingly the capacitance of the dummy cell bit lines Dummy GBL may be increased by connecting the cell capacitor CC of the dummy memory cell to the dummy cell bit lines Dummy GBL.

The bit line sense amplifier layer may include a plurality of bit line sense amplifier BLSA blocks 10, and an edge bit line sense amplifier (edge BLSA) located on both ends block 20 of the memory cell array 100. The edge bit line sense amplifier block 20 may be located under a corner portion adjacent to the column decoder 200 of the memory cell array 100 and a corner portion facing the same, respectively. The edge bit line sense amplifier (edge BLSA) block 20 may be located to partially overlap with the dummy cell array 110. The bit line sense amplifier BLSA block 10 may be located at a predetermined interval between two edge bit line sense amplifier (edge BLSA) blocks 20, and one or two or more may be located as needed.

Referring to FIG. 7, the bit line sense amplifier layer may be located below the memory cell array layer and include a transistor, a wiring layer BLP, and a via 13 for connecting the transistor and the wiring layer BLP. The transistor may include a source/drain 11 and a gate electrode 12, and the source/drain 11 and the gate electrode 12 may be connected to the wiring layer BLP located on the bit line sense amplifier layer through the via 13 located in the insulation layer.

Interlayer insulating layers 31 and 32 and a bit line BL and complementary bit line BLB may be located between the bit line sense amplifier layer and the memory cell array layer. The bit line sense amplifier BLSA and the edge bit line sense amplifier edge BLSA may be connected to the bit line BL and the complementary bit line BLB through a via 42 located in the interlayer insulating layer 32. The bit line BL and the complementary bit line BLB may be connected to the cell bit line GBL through a via 41 located in the interlayer insulating layer 31. Here, the bit line BL and the complementary bit line BLB, which are connected to one edge bit line sense amplifier edge BLSA, may be respectively connected to the cell bit line GBL of the memory cell array 100 and the dummy cell bit lines Dummy GBL of the dummy cell array 110, which are divided into both sides on the boundary region of the memory cell array 100 and the dummy cell array 110. The cell bit line GBL connected to the edge bit line sense amplifier edge BLSA may be either one of odd-numbered cell bit lines GBL and even-numbered cell bit lines GBL. The dummy cell bit lines Dummy GBL connected to the edge bit line sense amplifier edge BLSA may also be one of the odd-numbered dummy cell bit lines Dummy GBL and the even-numbered dummy cell bit lines Dummy GBL. The dummy cell bit line Dummy GBL connected to the edge bit line sense amplifier edge BLSA may be connected to the adjacent dummy cell bit lines Dummy GBL that is not connected to the edge bit line sense amplifier edge BLSA through the transistor switch GBL switch. The cell bit line GBL of the memory cell array 100 that is not connected to the edge bit line sense amplifier edge BLSA may be connected to the bit line sense amplifier BLSA.

As described above, by installing the edge bit line sense amplifier edge BLSA and the dummy cell array, it is possible to all make some cell bit lines GBL of the edges that were not used due to a non-pairing among the cell bit lines GBL of the memory cell array 100 have an open bit line structure in a usable state.

Referring to FIG. 8, by connecting two adjacent dummy cell bit lines Dummy GBL through the transistor switch GBL switch, the capacitance and resistance of the dummy cell bit line Dummy GBL can be increased. Therefore, the capacitance and resistance of the dummy cell bit lines Dummy GBL may be made to a magnitude sufficient for the capacitance and resistance of the cell bit line GBL while reducing the arrangement area of the dummy cell array 110. In addition, if a turn on signal is always applied to at least one of the dummy word lines Dummy WL to keep the transistor CT of the dummy memory cell turned on, the cell capacitor CC of the dummy memory cell is connected to the dummy cell bit lines Dummy GBL and then the capacitance of the dummy cell bit lines Dummy GBL increases. Through this, the arrangement area of the dummy cell array 110 may be further reduced.

Figure 9:
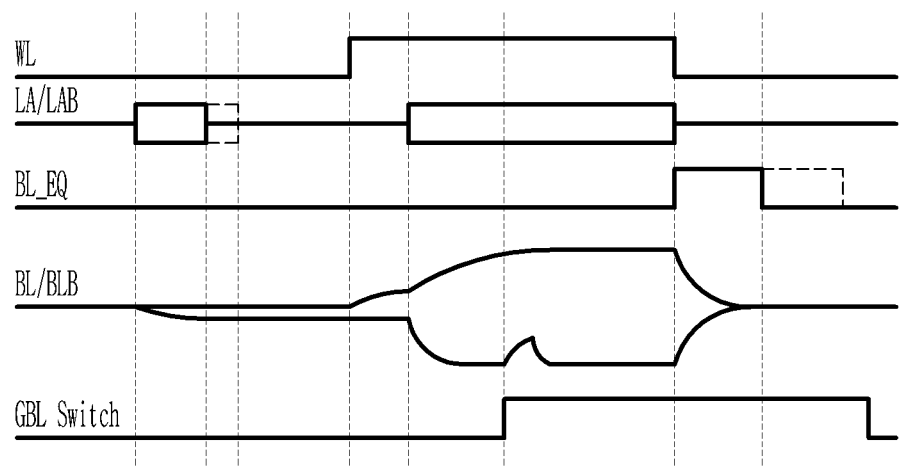
FIG. 9 is a driving timing diagram of a semiconductor memory device of FIG. 6.

FIG. 9 is a driving timing diagram of a semiconductor memory device of FIG. 6.

Referring to FIG. 9, the transistor switch GBL switch is turned on, after charge sharing, about a time that the edge bit line sense amplifier edge BLSA is activated and a potential difference (BL/BLB) between the bit line and the complementary bit line reaches its maximum (during a refresh operation), and then is turned off after an equalization signal BL EQ is applied and the voltages of the bit line and the complementary bit line become the same. By controlling the transistor switch GBL switch in this way, the detection speed of the edge bit line sense amplifier edge BLSA may be improved, and a Row Pre-charge Time (tRP) may be reduced.

Figure 10:
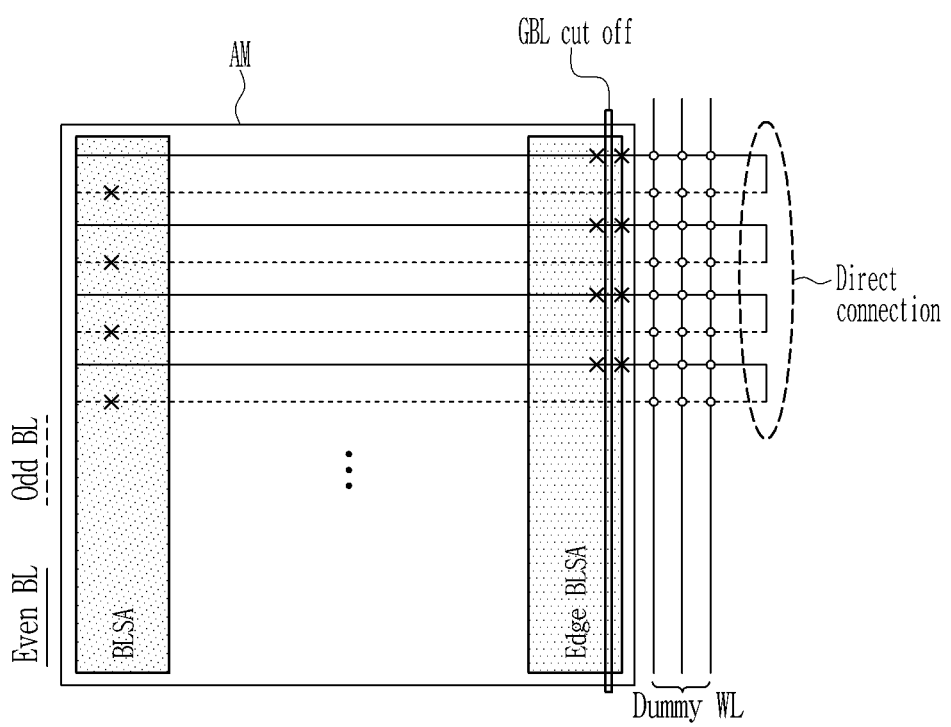
FIG. 10 is a more detailed partial layout view of a semiconductor memory device according to another embodiment of the present invention.

FIG. 10 is a more detailed partial layout view of a semiconductor memory device according to another embodiment of the present invention.

The semiconductor memory device of FIG. 10 does not have a transistor switch GBL switch that connects two adjacent dummy cell bit lines Dummy GBL differently from the semiconductor memory device of FIG. 6. The semiconductor memory device of FIG. 10 may have a structure in which two adjacent dummy cell bit lines Dummy GBL are directly connected.

Figure 11:
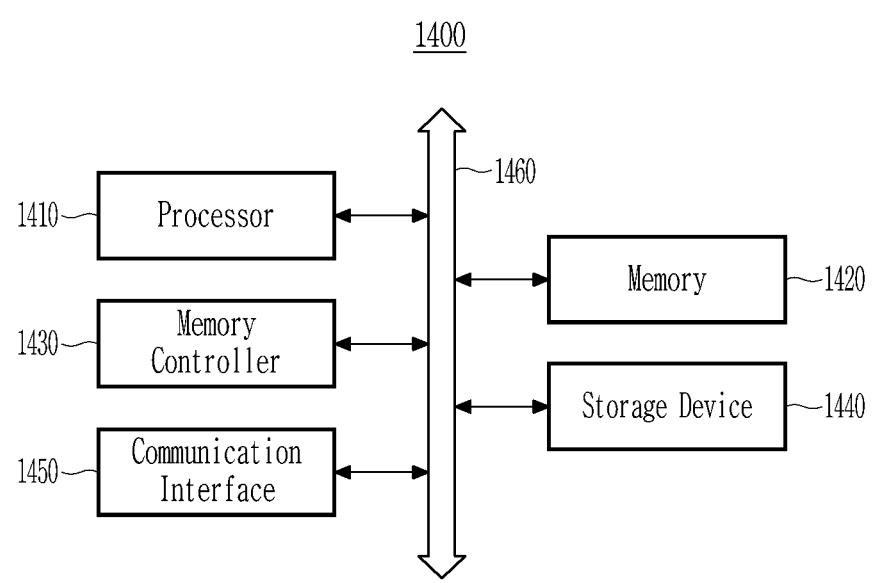
FIG. 11 is a block diagram showing one example of a computer device according to an embodiment.

FIG. 11 is a block diagram showing one example of a computer device according to an embodiment.

Referring to FIG. 11, a computing device 1400 includes a processor 1410, a memory 1420, a memory controller 1430, a storage device 1440, a communication interface 1450, and a bus 1460. The computing device 1400 may further include other general-purpose constituent elements.

The processor 1410 controls the overall operation of each component of the computing device 1400. The processor 1410 may be implemented as at least one of various processing units such as a central processing unit (CPU), an application processor (AP), and a graphics processing unit (GPU).

The memory 1420 stores various data and instructions. The memory 1420 may be implemented with the memory device described with reference to FIG. 1 to FIG. 10. The memory controller 1430 controls the transfer of the data or instructions to and from the memory 1420. In some embodiments, the memory controller 1430 may be provided as the processor 1410 and a separate chip. In some embodiments, the memory controller 1430 may be provided as an internal configuration of the processor 1410.

The storage device 1440 non-temporarily stores programs and data. In some embodiments, the storage device 1440 may be implemented with a non-volatile memory. The communication interface 1450 supports wired/wireless Internet communication of the computing device 1400. In addition, the communication interface 1450 may support various communication methods other than Internet communication. The bus 1460 provides a communication function between constituent elements of the computing device 1400. The bus 1460 may include at least one type of bus according to a communication protocol between the constituent elements.

In some embodiments, each constituent element, module, or unit expressed as a block in FIG. 1 to FIG. 10 may be implemented with a variable amount of hardware, software, and/or firmware structures that execute each function described above. For example, at least one constituent element, module, or unit may include various hardware constituent elements including a digital circuit capable of executing each function through the control of at least one microprocessor or other control device, a programmable or non-programmable logic device or array, an application specific integrated circuit (ASIC), or other circuits using a digital circuit structure such as a memory, a processor, a logic circuit, a lookup table, and the like. In addition, at least one constituent element, module, or unit includes at least one executable instruction word for performing a specific logic function and may be executed by at least one microprocessor or other control device. In addition, at least one constituent element, module, or unit may include or be implemented by a processor such as a CPU or a microprocessor that performs each function. A functional feature of any embodiment may be implemented as an algorithm running on at least one processor.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

DESCRIPTION OF SYMBOLS

1 GBL cut off; BLSA bit line sense amplifier; GBL cell bit line; BL bit line; BLB complementary bit line; BLP bit line sense amplifier metal line; WL word line; AM, AM1, AM2, AM3 array matrix; 11 bit line sense amplifier source/drain 12 bit line sense amplifier gate; 13 bit line sense amplifier via; 21 memory cell channel; CC cell capacitor; CT cell transistor

What is claimed is:
1. A semiconductor memory device comprising:
a memory cell array located in a first layer and including at least one word line, at least one cell bit line, and at least one memory cell located in a region where the at least one word line and the at least one cell bit line are crossed; and
at least one bit line sense amplifier located in a second layer, different from the first layer, and the bit line sense amplifier is connected to at least one bit line that is connected to the at least one cell bit line and to at least one complementary bit line corresponding to the at least one bit line,
wherein the bit line sense amplifier detects data stored in the at least one memory cell, and
wherein the at least one cell bit line is segmented into at least two portions, and the at least two portions are respectively connected to the at least one bit line and the at least one complementary bit line connected to the at least one bit line sense amplifier.

2. The semiconductor memory device as claimed in claim 1, wherein the at least one memory cell is located in a region overlapping, in a vertical direction, a region in which the at least one cell bit line is segmented to be separated from each other.

3. The semiconductor memory device as claimed in claim 1, wherein the at least one memory cell is not located in a region overlapping, in a vertical direction, a region in which the at least one cell bit line is segmented to be separated from each other.

4. The semiconductor memory device as claimed in claim 1,
wherein the at least one cell bit line is segmented in three or more portions to be separated from each other, and regions where the at least one cell bit line is segmented to be separated from each other include a first separation region and a second separation region, and
wherein the at least one memory cell is located in a region overlapping the first separation region in a vertical direction, and the at least one memory cell is not located in a region overlapping the second separation region in the vertical direction.

5. The semiconductor memory device as claimed in claim 1, wherein the at least one memory cell includes a vertical channel transistor.

6. The semiconductor memory device as claimed in claim 5, wherein a channel of the vertical channel transistor includes indium gallium zinc oxide (IGZO).

7. The semiconductor memory device as claimed in claim 1, wherein the at least two portions are formed on different layers from the at least one bit line and the at least one complementary bit line connected to the at least one bit line sense amplifier with a first insulation layer interposed therebetween and are connected through a via penetrating the first insulation layer.

8. The semiconductor memory device as claimed in claim 7, wherein the at least one bit line sense amplifier includes a connecting wiring layer, and a connection between the at least one bit line sense amplifier and the at least one bit line and the at least one complementary bit line is made via the connecting wiring layer.

9. The semiconductor memory device as claimed in claim 8, wherein the at least one bit line and the at least one complementary bit line are formed in a different layer from the connecting wiring layer with a second insulation layer located therebetween and are connected to the connecting wiring layer through a via penetrating the second insulation layer.

10. A semiconductor memory device comprising:
a memory cell array located in a first layer and including at least one word line, at least one cell bit line, and at least one memory cell, which is located in a region where the at least one word line and the at least one cell bit line are crossed;
a dummy cell array, which is located in the first layer and at at least one circumferential side of the memory cell array, includes at least one dummy word line, at least one dummy cell bit line, and at least one dummy memory cell located in a region where the at least one dummy word line and the at least one dummy cell bit line are crossed; and
at least one bit line sense amplifier located in a second layer, different from the first layer, and connected to at least one bit line connected to the at least one cell bit line and at least one complementary bit line corresponding to the at least one bit line, wherein the at least one bit line sense amplifier detects data stored in the at least one memory cell,
wherein the at least one bit line sense amplifier includes a first edge bit line sense amplifier that is located at a boundary between the memory cell array and the dummy cell array, and
wherein the at least one bit line and the at least one complementary bit line connected to the first edge bit line sense amplifier are respectively connected to the at least one cell bit line and the at least one dummy cell bit line.

11. The semiconductor memory device as claimed in claim 10, wherein the at least one dummy cell bit line includes an odd-numbered dummy cell bit line and an even-numbered dummy cell bit line, and one of the odd-numbered dummy cell bit line and one of the even-numbered dummy cell bit line, which are adjacent to each other, are connected to each other through a switch.

12. The semiconductor memory device as claimed in claim 11, wherein a turn on signal is always applied to the at least one dummy word line.

13. The semiconductor memory device as claimed in claim 11, wherein the switch turns on after the first edge bit line sense amplifier is activated following charge sharing and turns off after an equalization signal is applied to the first edge bit line sense amplifier.

14. The semiconductor memory device as claimed in claim 10, wherein the at least one dummy cell bit line includes an odd-numbered dummy cell bit line and an even-numbered dummy cell bit line, and one of the odd-numbered dummy cell bit line and one of the even-numbered dummy cell bit line, which are adjacent to each other, are connected to each other.

15. The semiconductor memory device as claimed in claim 14, wherein a turn on signal is always applied to the at least one dummy word line.

16. The semiconductor memory device as claimed in claim 10, wherein the cell bit line connected to the first edge bit line sense amplifier is either an odd cell bit line or an even cell bit line.

17. The semiconductor memory device as claimed in claim 10,
wherein the at least one bit line sense amplifier includes a second edge bit line sense amplifier, and
wherein the first and second edge bit line sense amplifiers are located at edges of the memory cell array on a column decoder side and an opposite side, respectively.

18. The semiconductor memory device as claimed in claim 10, wherein the at least one memory cell includes a vertical channel transistor.

19. The semiconductor memory device as claimed in claim 18, wherein a channel of the vertical channel transistor includes indium gallium zinc oxide (IGZO).

20. The semiconductor memory device as claimed in claim 10, wherein the at least one cell bit line and the at least one dummy cell bit line are formed in different layers from the at least one bit line and the at least one complementary bit line connected to the first edge bit line sense amplifier with a first insulation layer located therebetween and are connected to each other through a via penetrating the first insulation layer.

* * * * *